United States Patent [19]

Gerlits

[11] Patent Number: 4,600,812
[45] Date of Patent: Jul. 15, 1986

[54] COMMUNICATION SYSTEM HAVING ABBREVIATED DIALING ACCESS

[75] Inventor: Robert R. Gerlits, Denver, Colo.

[73] Assignee: AT&T Information Systems Inc., Holmdel, N.J.

[21] Appl. No.: 674,234

[22] Filed: Nov. 23, 1984

[51] Int. Cl.⁴ .................. H04M 3/44; H04M 7/00
[52] U.S. Cl. .................... 179/18 AD; 179/18 BA
[58] Field of Search ........ 179/18 AD, 18 BA, 18 B, 179/18 HA, 27 CA, 18 ET, 18 EA

[56] References Cited

U.S. PATENT DOCUMENTS

| | | | |
|---|---|---|---|
| 3,160,713 | 12/1964 | Williford ................ | 179/18 BA |
| 3,573,389 | 4/1971 | Greenstein et al. ........... | 179/18 BA |
| 3,689,703 | 9/1972 | Allen et al. ................ | 179/18 B |
| 3,975,595 | 8/1976 | Berube et al. .............. | 179/18 BA |
| 4,442,321 | 4/1984 | Stehman .................. | 179/18 EB |
| 4,488,004 | 12/1984 | Bogart et al. .............. | 179/18 AD |

*Primary Examiner*—Thomas W. Brown
*Attorney, Agent, or Firm*—John A. Caccuro

[57] ABSTRACT

In private PBX communication systems the number of dialing digits required to establish a connection between stations at different PBXs of the system includes PBX location code digits and station address digits. Abbreviated dialing is accomplished by using one or more digits of the PBX location code as both location code digits as well as part of the digits which comprise the station address.

9 Claims, 7 Drawing Figures

| STATIONS/PBX | PBX LOCATION CODE |
|---|---|
| 1-100 | ONE UNIQUE 2 DIGIT CODE |
| 100-1000 | • MULTIPLE UNIQUE 2 DIGIT CODES<br>• FIRST DIGIT FIXED, SECOND DIGIT DETERMINED BY NUMBER OF HUNDREDS OF STATIONS AT PBX |
| >1000 | • MULTIPLE UNIQUE 2 DIGIT CODES<br>• FIRST DIGIT DETERMINED BY NUMBER OF THOUSANDS OF STATIONS AT THAT PBX |

FIG. 6

COMMUNICATION SYSTEM HAVING ABBREVIATED DIALING ACCESS

TECHNICAL FIELD

This invention relates to abbreviated dialing of telephone numbers on a private communication network and more particularly to apparatus and a method for using one or more digits of an abbreviated dialing code as part of both the location code and station number.

BACKGROUND OF THE INVENTION

In private communication systems including multiple private branch exchanges (PBXs), a uniform numbering plan (UNP) feature gives a user the ability to call any other designated party on the network by dialing a single unique station number. Typically, the called number includes an access code digit, a location code and a station code or number to establish a call. The location code includes up to three digits to designate the PBX where the call is to terminate, while the station number may be two, three or four digits to identify the called station at the called PBX. Existing UNP network features require the length of the location code and station number to be fixed. Thus, if one PBX requires four digits for its station address, then four digits must be utilized for all the station addresses for any PBX on the network.

Customers desire an abbreviated dialing arrangement to reduce the number of dialed digits, dialing errors and signaling time.

SUMMARY OF THE INVENTION

According to the present invention dialing is abbreviated by utilizing one or more digits of the location code as digits of the station number. While the location code still designates the destination PBX, at the destination PBX all or a portion of the location code digits may also be used as part of the station number. Thus, the total digits required for the location and station codes may be reduced one to three digits depending on the size of the communication network. Besides saving the customer dialing time, the invention utilizes trunk and digit collecting circuitry more efficiently by reducing the amount of time to outpulse and collect the called number at each node.

BRIEF DESCRIPTION OF THE DRAWING

The detailed description of the invention will be more fully appreciated from the illustrative embodiment shown in drawing, in which.

GENERAL DESCRIPTION

Figure 1:
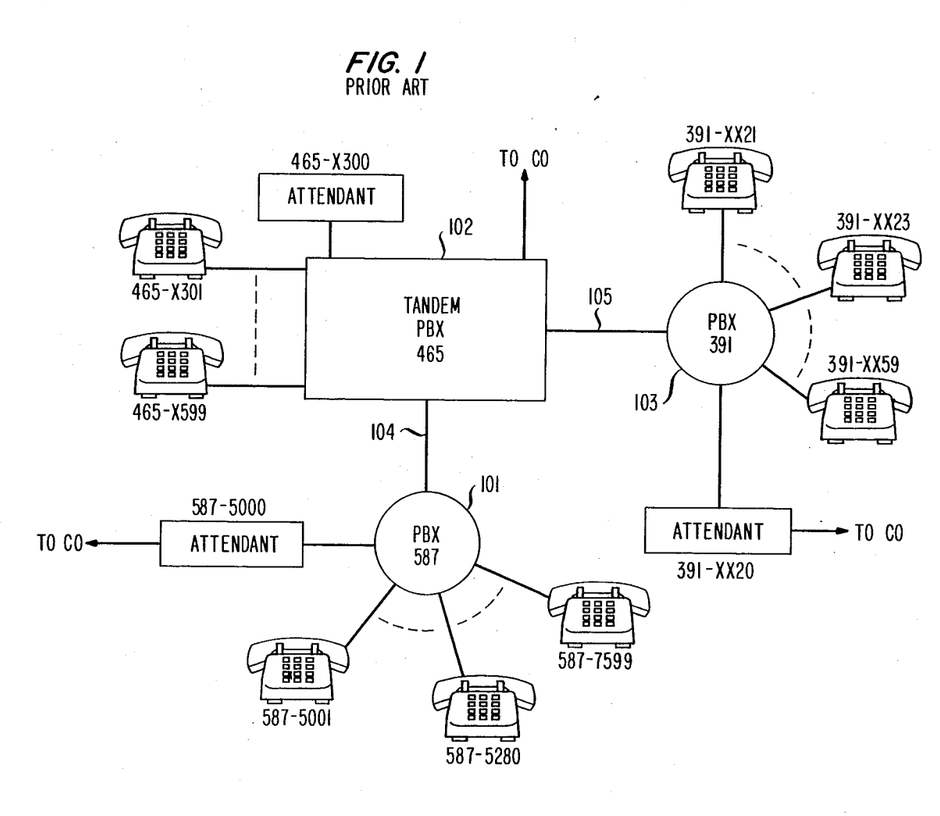
FIG. 1 illustrates a private communication system utilizing prior art dialing codes.

With reference to FIG. 1 there is shown the prior art dialing plan as used in a private communication system which, illustratively, includes three nodes each including a private branch exchange (PBX) 101, 102 and 103. Trunks 104 and 105 interconnect the PBX 101, 102 and 103. Stations at each PBX can make calls to stations on the same PBX or to stations on other PBXs of the system via trunks 104 and 105. Calls to stations on the DDD network are made via the CO lines at each PBX. Each PBX can be any of a number of PBX types or equivalent communication switches arranged with the automatic alternate routing (AAR) and uniform numbering plan (UNP) features. The AAR feature provides automatic routing of the trunk calls over facilities selected from several alternate trunk groups. Facilities are selected in descending order of desirability for placing a particular call. While the disclosed embodiment of the present invention is embedded as part of the AAR feature, the AAR feature in and of itself is not a necessity for the operation of the present invention. If no AAR feature exists at the PBX then the present invention requires the PBX to be able to recognize dialed location codes and to be able to select trunks to route a call to the PBX having the dialed location code.

The UNP feature permits users at any main or tandem PBX to place calls over tie trunks using a uniform dialing plan. The user dials the AAR access code (typically the digit 8) followed by a uniform 4, 5, 6 or 7 digit network address which uniquely identifies each station. The uniform number consists of a 2 or 3 digit location code and a 2, 3 or 4 digit station code. The UNP feature provides the number translation and supervision necessary to route the call.

In FIG. 1, PBX 101 has location code 587 and stations thereat use the numbers 5000-7599. PBX 102 has location code 465 and stations thereat use the station numbers 300-599 while PBX 103 uses the location code 391 and stations thereat use numbers 20-59. Uniform numbering plan (UNP) requires a uniform number or digits irrespective of the station on the private network that is called. Thus, since PBX 101 requires 4 digits for its station numbers, all calls from PBX 101 to a station ar PBXs 102 or 103 will also require 4 digits. Thus, UNP requires that calls use a three digit location code and a four digit station number.

Assuming the AAR dial access code is 8, a typical AAR call scenario follows. Stations at PBX 101 or PBX 103 could call a station 599 at PBX 102 by dialing 8-465-D599 where D is a dummy digit. On this call when the address digits reach PBX 102, the processor at PBX 102 recognizes 465 as its own PBX location code. The processor at PBX 102 deletes the location code (i.e., 465), finds out how many station digits are needed to address stations at the PBX (i.e., three), deletes the dummy digit since it is not needed and routes the call to station 599.

As another example, stations at PBX 101 or PBX 102 could reach station 23 at PBX 103 by dialing 8-391-DD23. At PBX 103, the processor would recognize 391 as its own location code and delete it. The processor finds that only two station digits are necessary at PBX 103 and deletes the two dummy digits leaving the digits 23 for routing the call to station 23.

Similarly, stations at PBX 102 or PBX 103 could call station 5280 at PBX 101 by dialing 8-587-5280. At PBX 101, after the AAR program of the processor recognizes 587 as its own location code it is deleted. Since PBX 101 requires 4 station digits, all 4 digits (5280) are used to reach the called station.

According to the present invention the AAR dialing access is abbreviated or simplified. Instead of using separate location code digits and the station address digits, abbreviated AAR dialing, according to the present invention, uses one or more digits of the location code as station digits. So, while the location code still designates the destination PBX, one or more of the digits of the location code are also used as part of the station address. The following example should clarify the distinction between the prior art AAR dialing access and abbreviated AAR dialing access according to the present invention.

Figure 2:
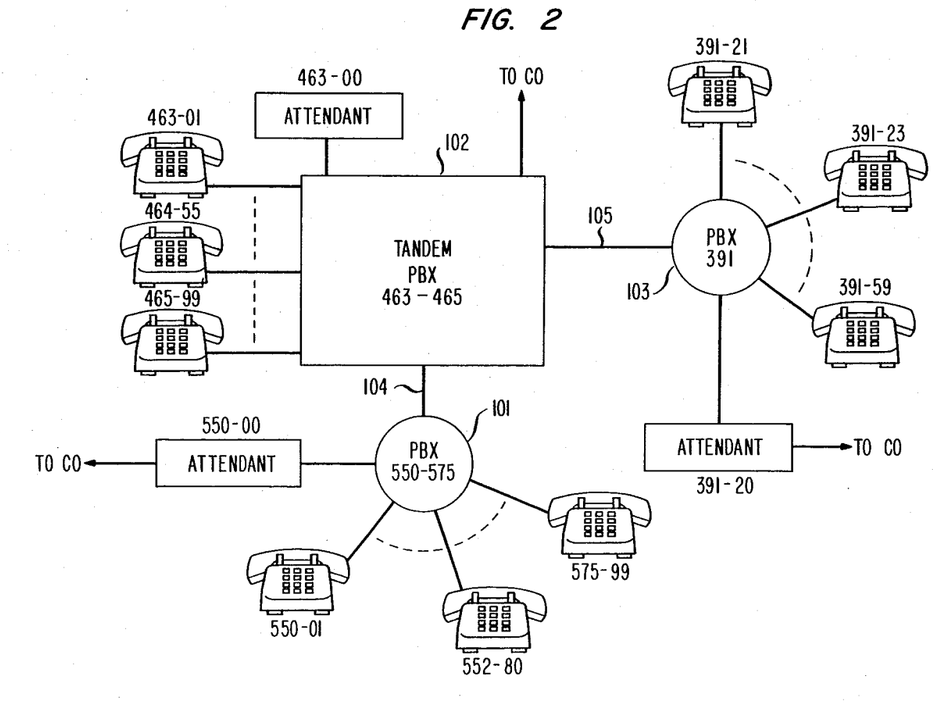
FIG. 2 illustrates a private communication system utilizing one aspect of the abbreviated dialing plan according to the present invention.

FIG. 2 illustrates the present abbreviated dialing access using the network configuration of FIG. 1. FIG. 2 illustrates that by redefining the 3 digit location codes and by utilizing more than one location code at a PBX location, the number of station digits sent can be decreased to 2 digits while still maintaining 4 digit station address capability at the PBX locations. The 4 digit station address capability is derived by combining the 2 station digits with the last two location code digits. In the FIG. 2 example, the number of location code digits is set to 3 while the number of network station digits is set to 2. At the destination PBX a portion of the location code will be used where digits are needed for the station numbers at that PBX. In FIG. 2, PBX 101 has location codes of 570-575 and station addresses are in the range of 5000 to 7599. Note that the last two digits of the location code (50-75) are combined with the station digits (0-99) to derive the complete station number (i.e., 50-75 are the first two digits for stations 5000-7599). Thus, in FIG. 2, PBX 101 can still access the stations, 5000-7599, which it was able to access in FIG. 1, but only the access code plus 5 digits need to be dialed. PBX 102 is redefined to use location codes of 463 and 464 and still can access station numbers in the range of 300-599. Thus, at PBX 102 the last digit of the location code is used as part of the station number (i.e., 3, 4 or 5 is used as the first digit for stations 300-499). PBX 103 has a location code of 391 and station numbers in the range of 20-59. No digits in the location code are used at PBX 103 (i.e., the number of stations that can be addressed using the two station address digits is greater than or equal to the actual number of stations at this PBX).

When a station at PBX 101 or PBX 102 calls, for example, station 23 at PBX 103, they use the abbreviated dialing number 8-391-23. At PBX 103, the 391 is determined to be the home location code, but the processor at PBX 103 does not automatically discard the location code as was done in the prior art AAR arrangements. Rather, the processor checks how many station digits are necessary to access the stations located at this PBX. Since only 2 station digits are needed to address any station at PBX 103, only the station digits (23) are kept and the location code (391) is discarded so only the number 23 is used as the station address digits.

Stations at PBX 101 or PBX 103 could call, for example, station 455 at PBX 102 by the abbreviated dialing number 8-464-55. At PBX 102, the abbreviated dialing digits are received and its processor determines that 464 is its own location code. The processor also determines the number of station digits needed to access stations at PBX 102. Since 3 station digits are needed, the processor at PBX 102 discards all but the final 3 digits (455) of the received dialing digits. Thus, the last digit of the location code (4) is used as the first digit of the station number (455).

Stations at PBX 102 or PBX 103 could call, for example, station 5280 at PBX 101 by dialing 8-552-80. The processor at PBX 101 would determine that location 552 is the home location code. Since 4 digits are needed to uniquely identify a station at PBX 101 the processor uses the final 4 digits (5280) to complete the call to station 5280. The last two digits of the location code (52) are combined with the two station digits (80) to arrive at the complete dialed station number (5280).

Figure 3:
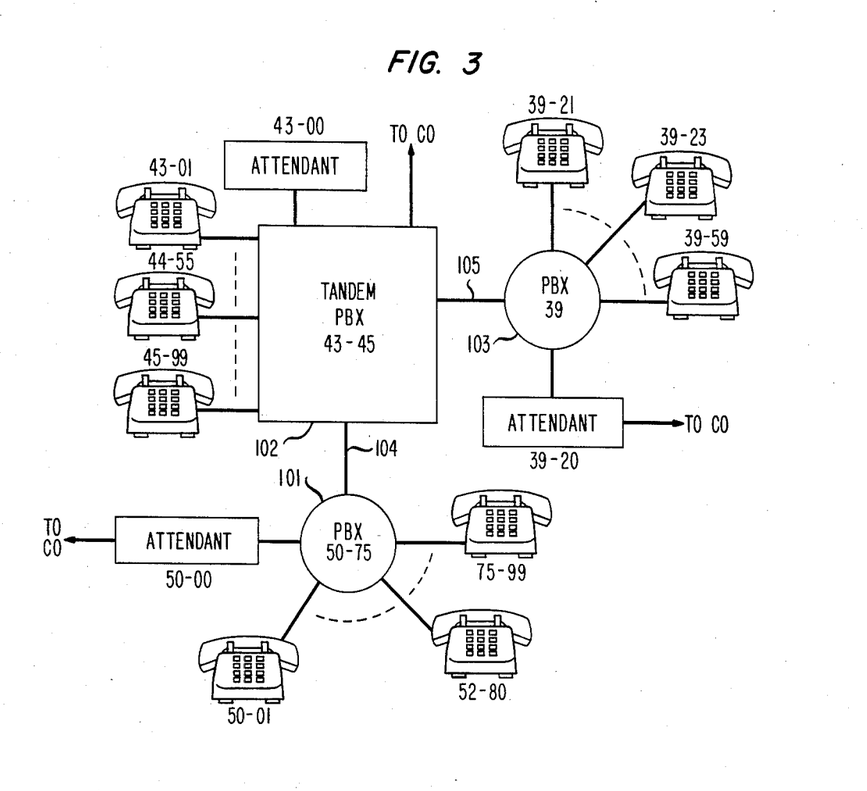
FIG. 3 illustrates a private communication system utilizing another aspect of the abbreviated dialing plan according to the present invention.

FIG. 3 illustrates the present invention using 2 digit location codes and 2 digit network station numbers. PBX 101 is assigned location code of 50-75 and the station digits are still in the range of 5000-7599. Both location code digits are used as part of the station number at PBX 101 (i.e., 50-75 are the first two digits of stations 5000-7599). PBX 102 is assigned location codes of 43-45 and the station digits are still in the range of 300-599. At PBX 102 only the last digit of the location code (i.e., 3, 4 or 5) is combined with the station digits to form the complete station number. Thus the 3, 4 or 5 is used as the first digit in the station number (300-599). PBX 103 has a location code of 39 and station digits are still 20-59. No portion of the location code is needed to reach a station at PBX 103.

Any station at PBX 101 or PBX 102 could call station 23 at PBX 103 by dialing 8-39-23. At PBX 103, the processor determines that 39 is its own location code and since only 2 digits are needed to identify a station at PBX 103, the 39 will be deleted and the received sation digits 23 are used to route the call to station number 23.

Stations at PBX 101 or PBX 103 could reach station 455 at PBX 102 by dialing 8-44-55. The processor at PBX 102, in accordance with the present invention, determines that 44 is its own location code and since 3 digits are necessary to uniquely identify a station at PBX 102, the final 3 digits (455) are kept for routing the call to that station. The last digit in the location code (4) becomes the first station digit (in 455) at PBX 102.

Stations at PBX 102 and PBX 103 could reach station 5280 at PBX 101 by dialing 8-52-80. The processor at PBX 101 determines that location code 52 is its own location code and since 4 station digits are required at PBX 101, the 52 would not be deleted as in prior art systems. But rather the location code digits (52) are combined with the station digits to generate the complete station number (5280). Thus, at PBX 101, the location code digits (52) are used both as the location code and as the first two digits of the station number.

Thus, FIG. 3 illustrates how a small network using prior art dialing access requires the user to dial 8 digits while using the present abbreviated dialing access of the present invention dialing is reduced to 5 digits. The number of address digits (dialed digits excluding the dial access code 8) is actually reduced from 7 to 4.

Figure 4:
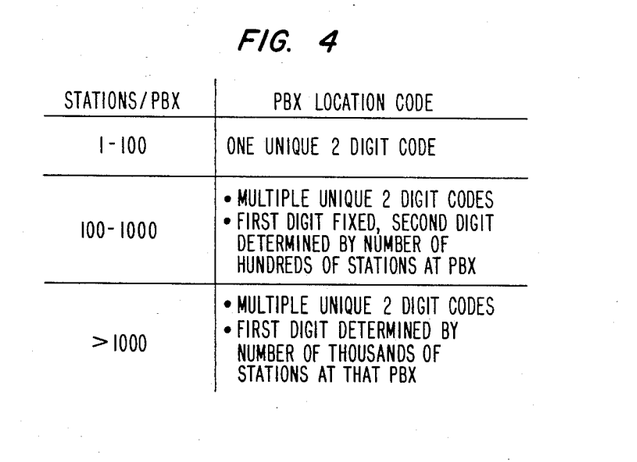
FIG. 4 shows a table illustrating the relationship between stations per PBX and PBX location codes.

A four digit dialing code, illustrated in FIG. 3, can be utilized in a communication system where the number of telephones is less than 10,000 and the number of PBX locations is determined by the distribution of the number of telephones at each PBX. As described however, the number of telephones utilized is much less than 10,000 since the first digit is dedicated for use as an access code (e.g., the digit 8). With joint reference to FIGS. 3 and 4, if a PBX (e.g., 103 of FIG. 3) has less than 100 stations, then only one system wide unique 2 digit location code (i.e., 39) is needed to uniquely identify PBX 103, and only 2 station digits are required to select the station at PBX 103. If, however, a PBX (e.g., 102 of FIG. 3) has more than 100 stations but less than 1000 stations, then multiple unique two digit location codes are needed to uniquely identify that PBX and each station thereat. Thus, at PBX 102 of FIG. 3 since there are 300 phones, then according to FIG. 4 there are 3 unique two digit location codes (43, 44, 45) required to uniquely identify PBX 102 and each station thereat. When a PBX has more than 1000 stations, then multiple unique 2 digit location codes are needed to identify that PBX. Hence at PBX 101 of FIG. 3, since there are 2600 stations, there are 26 unique 2 digit location codes (50 through 75) including 3 unique first digits (5, 6 and 7) needed to identify PBX 101 and the station thereat.

In a similar manner if a system has less than 1000 station sets on the network, then three digit uniform numbering may be implemented in a similar manner by using one location code digit and two station digits.

The present abbreviated dialing access method and apparatus gives the customer the ability to utilize the existing uniform numbering plan (UNP) in use today. In addition, the customer has the flexibility to reduce the number of dialing address digits by combining one or more of the location code digits with the station digits to derive the station number at the terminating PBX. In a small network, this flexibility allows the customer to dial a minimum of four address digits even if one of the PBXs in the network requires four station digits. In standard UNP, a minimum of six address digits would be required for the same configuration. This reduction in the number of address digits besides reducing the possibility of misdialing also reduces the call completion time by reducing the customer dialing time, digit collection time at each PBX and the time for the digits to be sent between PBXs.

Figure 5:
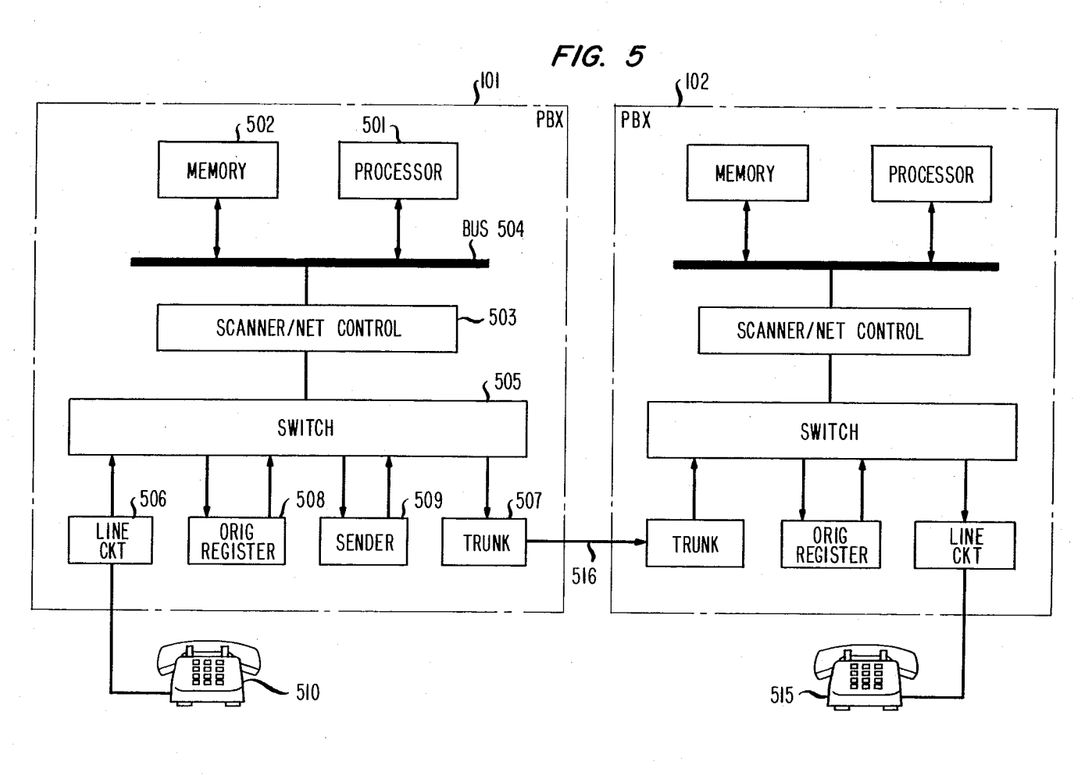
FIG. 5 shows a block diagram of two PBXs illustrating the communication connection of a typical station to station call.

With reference to FIG. 5 a block diagram of a typical PBX used with the present invention will be described. FIG. 5 shows only an originating PBX 101 and a terminating PBX 102 but obviously a tandem PBX could be located between them on trunk 516. While the following description assumes a digital PBX using time division multiplexing, the present invention can be implemented to operate with any program controlled digital or analog PBX. Each of the standard PBXs (101 and 102) includes, shown in block diagram form in FIG. 5, a processor (e.g., 501) for controlling operations in response to programs stored in a memory (e.g., 502). The processor 501 communicates with memory 502 and scanner and switch controller 503 over bus 504. Scanner and switch control 503 in response to commands from processor 501 causes switch 505 to scan the line circuits (e.g., 506) and trunk circuits (e.g., 507) to detect call signaling and to connect the appropriate origination registers (e.g., 508) and senders (e.g., 509) to a call. Line circuit 506 is dedicated to each station set (e.g., 510) connected to PBX 101. It should be noted that the same scanning takes place on a call received over a trunk circuit of PBX 101. Origination register 508 and sender 509 are pooled and are only connected to station sets during the dialing and sending mode. Trunk circuits 507 are pooled over a group of trunks which connect PBX 101 to other PBXs (e.g., 102).

Figure 6:
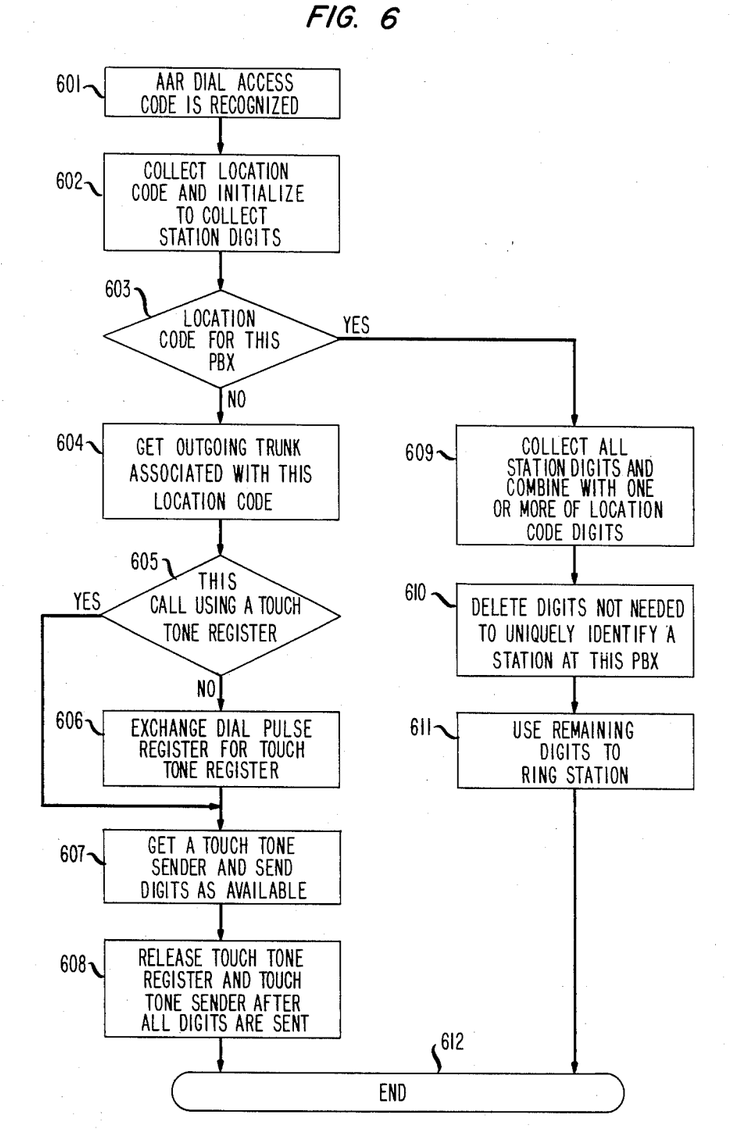
FIG. 6 shows a flow chart illustrating the sequence of control steps utilized by the present invention to control the PBX shown in FIG. 5.

With joint reference to FIGS. 5 and 6 the operation of the present invention is described in detail. FIG. 6 describes the functions performed under program control at each PBX in accordance with the present invention. Assume a customer or user at station set 510 desires to call a person at station set 515 of PBX 102. If station set 510 uses dial pulsing, processor 501 invokes a program to count the dial pulses which are received by line circuit 506 and connected via switch 505 to scanner and switch control 503. If station set 510 uses touch tone signaling, processor 501 connects origination register 508 via switch 505 to line circuit 506. Origination register 508 includes a multi-frequency tone receiver circuit for decoding the multi-tone signals.

If the AAR dial access code is dialed, step 601, by a user at station set 510, the digit is decoded and the present inventive abbreviated dialing method and apparatus is enabled in a well known manner to receive the location code. Note, if an AAR dial access code is received over an incoming trunk it also invokes the present invention. If the digit is not the AAR dial access code, processor 501 invokes in a well known manner the appropriate program and responds accordingly. In step 602, once the correct number of location code digits are collected via origination register 508, the apparatus is reset to the expected number of digits in the network address and a possible travelling class mark. Note, the number of digits in the location code and station address, as shown in step 602 of FIG. 6, are previously specified as an input parameter of the program. When a user at station 510 dials the AAR dial access code the digit is recognized as the AAR dial access code, the number of digits to collect is set equal to the number of digits in the location code. The location code is collected, the number of digits to collect is reset to collect the number of network station digits and a possible travelling class mark. In step 603, a table lookup is used to determine if the location code matches the location code for this PBX or for a distant PBX. If the location code is for this PBX, control is passed to step 609. Step 604 assumes the location code is for distant PBX 102, so tables (not shown) are used to determine the appropriate outgoing trunk (e.g., 516). The outgoing trunk, 516, is seized by connecting a trunk circuit 507 to it. Trunk circuit 507 is connected to switch 505 on a second time slot different from the time slot used to receive dialing signals.

After the trunk is seized, a test is made in step 605 to see if a dial pulse or multi-tone register is being used for digit collection. If a multi-tone register is used then step 607 is performed. In step 606, since a dial pulse register is being used for digit collection, it is swapped for a multi-tone register (part of originating register 508). The multi-tone register also serves as a two port originating register 508 and is used in sending digits to trunk circuit 507 on a second time slot different from the time slot that is used to receive the digits. This permits overlapped outpulsing, that is, you can outpulse digits while in the process of receiving digits. In step 607, a multi-tone sender 509 is seized and connected to the second time slot of the two port originating register. The multi-tone sender regenerates all of the digits already collected and sends them over the outgoing trunk 516 using trunk circuit 507. As more digits are collected, they are also regenerated and sent over the outgoing trunk 516.

In step 608, when all digits are sent, the two port originating register 508 and the multi-tone sender 509 are released and both the calling party and the outgoing trunk are placed on the same time slot. The second time slot is also released. Further processing takes place at the distant PBX 102. There is no further call setup processing done at PBX 101.

The operation at PBX 102 is initiated in much the same manner as described in steps 601–607. The operation at PBX 102 then proceeds in a manner identical to that described in steps 609–611 below except that the call is from a station external to PBX 102. In step 609, since station 510 is calling another station at PBX 101 the location code is for this PBX, the processor 501 collects the remaining digits. When all digits are collected the multi-tone originating register 508 (or the dial pulse register) is released. Step 610 illustrates the essential difference between the present invention utilizing abbreviated dialing access and the standard dialing access. For the present abbreviated dialing, the program (FIG. 6) determines how many station digits are needed to address a station at this PBX and deletes one or more digits of the location. In the prior AAR, the location code is deleted and the remaining number of digits is always greater than or equal to the number of network station digits. AAR then deletes more digits if necessary. In step 611 the remaining digits are used by PBX 102 to route the call to the associated station.

Figure 7:
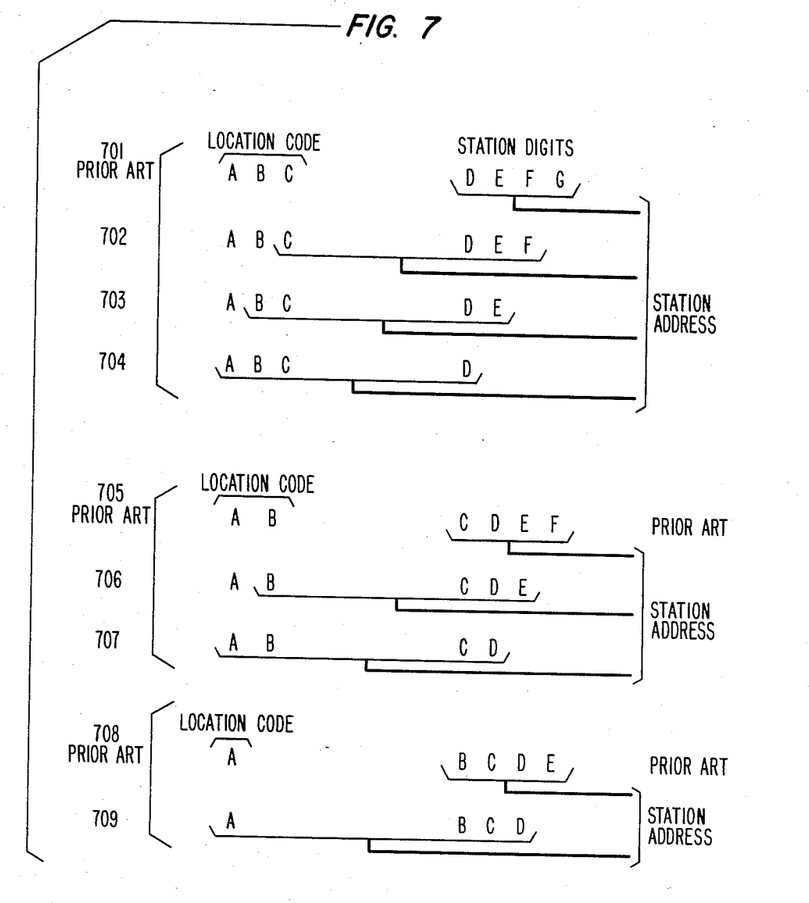
FIG. 7 shows the various abbreviated dialing plans possible using a three, two or one digit location code and a four digit station code.

FIG. 7 illustrates the possible dialing combinations of location codes and station digits which can be utilized according to the present invention. The prior art arrangements for three, two and one digit location codes are shown as 701, 705 and 708. The associated dialing access combinations according to the present invention are shown as 702, 703, 704; 706, 707, 709, respectively. To implement one of the combinations, the appropriate parameters defining the number of location code digits and the number of station address digits are entered into the program. For the three digit location code case one, two or three digits (702, 703 or 704) subset of the location code can be used as part of the station address. For the two digit location code case one or two digits (706 or 707) can be used as part of the station address. For the one digit location code case that one digit (709) can be used as part of the station address. It should be noted that the present invention also handles the prior art cases 701, 705 and 708.

By decreasing the number of address digits, the present invention simplifies dialing for the customer by reducing the number of digits to remember and dial resulting in fewer errors. Since the present invention sends fewer digits to enable a call connection, the multitone receiver (or originating register), sender and trunk do not have to be held as long during the transmission or reception of digits. Hence, the PBXs can get by with a fewer number of these circuits. Additionally, sending fewer digits reduces call completion time by reducing dialing time, by reducing digit collection time at each PBX and by reducing digit sending time at each PBX. The present abbreviated dialing access method and apparatus allows the existing AAR dialing plans to work but allows the customer a more flexible way to set up the AAR dialing plan to shorten the number of dialed digits.

What has been disclosed is merely illustrative of the present invention and other arrangements or methods can be implemented by those skilled in the art without departing from the spirit and scope of the present invention.

What is claimed is:

1. An abbreviated dialing access communication system including a multiple node network, each node uniquely addressable using a location code including at least one digit of a dialing signal and each node comprising multiple stations each addressable using a station number address contained in said dialing signal, each of said nodes further comprising means for determining if a node is the dialed node by receiving and comparing the received at least one digit location code of the dialing signal with a unique location code assigned that node and means responsive to said determining means for combining a subset of said at least one digit location code with the remaining digits of said received dialing signal for use as the dialed station number address at said dialed node.

2. The abbreviated dialing access communication system of claim 1 wherein at least one of said nodes is addressable using two or more unique location codes.

3. The abbreviated dialing access communication system of claim 1 wherein each of said nodes further includes automatic alternate routing means responsive to an access code prepended to said dialing signal.

4. The abbreviated dialing access communication system of claim 1 wherein said determining means uses the last four digits of said dialing signal as said dialed station address.

5. A private branch exchange (PBX) comprising multiple stations and connected to an external trunk, said PBX establishing calls to a selected station in response to a dialing signal received over said external line, said signal including at least a one digit location code and a station address digit, said PBX further comprising means for determining if said PBX is the dialed PBX by receiving and comparing the received location code digits of the dialing signal with a location code assigned to said PBX, and means responsive to said determining means for combining one or more digits of said location code with the remaining digits of said received dialing signal for use as the dialed station number address at said dialed PBX.

6. The PBX of claim 5 wherein said PBX uses two or more assigned location codes.

7. The PBX of claim 5 wherein said determining means uses the last four digits of said dialing signal as said dialed station address.

8. A method of abbreviating the number of dialing digits necessary for establishing calls between stations of different private branch exchanges (PBXs) of a communication system, said dialing digits including a location code having at least one digit for addressing a called PBX and a station digit for addressing a called station at said called PBX, said method comprising the steps of determining at each PBX if that PBX is the dialed PBX by comparing the received location code with a location code assigned to that PBX and combining at a dialed PBX at least one digit of said location code with said station digit for use as the station number address to determine the called station.

9. A method of abbreviating the number of dialing digits necessary for establishing a connection between a calling station external to and a station internal to a private branch exhange (PBX), said dialing digits including a location code having at least one digit for addressing said PBX and a station digit for addressing a station at said PBX, said method comprising the steps of:

determining if a PBX is the dialed PBX by comparing the received location code with a location code assigned to said PBX and combining at a dialed PBX at least one digit of said location code with the remaining digits of said dialing signal digits for use as the dialed station number address at said dialed PBX.

* * * * *